(12) United States Patent
Schiek et al.

(10) Patent No.: US 11,518,239 B2
(45) Date of Patent: Dec. 6, 2022

(54) DRIVE ASSEMBLY FOR A MOTOR VEHICLE

(71) Applicant: Dr. Ing. h.c. F. Porsche Aktiengesellschaft, Stuttgart (DE)

(72) Inventors: Werner Schiek, Jettingen (DE); Sebastian Watzl, Friolzheim (DE); Steffen Sachs, Weissach (DE); Thorsten Brobeil, Rottenburg (DE); Martin Kinscher, Loechgau (DE); Rainer Gebhardt, Weinstadt (DE); Simon Jahnke, Mönsheim (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 201 days.

(21) Appl. No.: 17/118,821

(22) Filed: Dec. 11, 2020

(65) Prior Publication Data

US 2021/0237564 A1 Aug. 5, 2021

(30) Foreign Application Priority Data

Feb. 3, 2020 (DE) ..................... 10 2020 102 559.9

(51) Int. Cl.
| | |
|---|---|
| *B60K 17/00* | (2006.01) |
| *F16F 3/087* | (2006.01) |
| *B60K 5/12* | (2006.01) |
| *B60K 1/00* | (2006.01) |
| *F16F 15/08* | (2006.01) |

(52) U.S. Cl.
CPC ................ *B60K 17/00* (2013.01); *B60K 1/00* (2013.01); *B60K 5/1208* (2013.01); *F16F 3/0876* (2013.01); *F16F 15/08* (2013.01)

(58) Field of Classification Search
CPC ........ B60K 17/00; B60K 1/00; B60K 5/1208; B60K 5/1216; F16F 3/0876; F16F 15/08; F16F 2226/045; F16F 1/3732; F16F 1/3842; F16F 1/3849; F16H 57/02; F16H 2057/02013
See application file for complete search history.

(56) References Cited

FOREIGN PATENT DOCUMENTS

| CN | 109501565 A | * | 3/2019 | ............... B60K 1/00 |
| DE | 102004061563 B3 | * | 3/2006 | ............. F16H 3/663 |
| WO | 2013189710 A1 | | 12/2013 | |

\* cited by examiner

*Primary Examiner* — Jacob M Amick
*Assistant Examiner* — Charles J Brauch
(74) *Attorney, Agent, or Firm* — RatnerPrestia

(57) ABSTRACT

A drive assembly for a motor vehicle includes a drive, a transmission that can be driven by the drive, a drive housing, a transmission housing, and a fastening device. The drive is arranged in the drive housing, and the transmission is arranged in the transmission housing. The drive housing or the transmission housing can be fastened on a carrier by way of the fastening device. The fastening device includes a plurality of vibration dampers and sleeve elements. The sleeve elements surround the vibration dampers.

15 Claims, 6 Drawing Sheets

DRIVE ASSEMBLY FOR A MOTOR VEHICLE

CROSS-REFERENCE TO RELATED APPLICATION

This application claims priority to German Patent Application No. 10 2020 102 559.9, filed Feb. 3, 2020, the content of such application being incorporated by reference herein in its entirety.

FIELD OF THE INVENTION

The present invention relates to a drive assembly for a motor vehicle.

BACKGROUND OF THE INVENTION

Drive assemblies that have a drive and a transmission that can be driven by the drive are known from the prior art. Here, the drive is arranged in a drive housing and the transmission is arranged in a transmission housing.

WO 2013/189710 A1, which is incorporated by reference herein, discloses an assembly of this kind in which the drive housing is fastened on a carrier means via an elastomer element. The elastomer element serves to damp vibrations, thus ensuring that they are not transmitted from the drive housing to the carrier means and thus onward to other body elements.

Given this prior art, it would be desirable to provide an improved drive assembly. Moreover, the intention is to provide a motor vehicle that has an assembly of this kind.

SUMMARY OF THE INVENTION

The drive assembly comprises a drive, a transmission that can be driven by the drive, a drive housing, a transmission housing, and a fastening means. The drive can be designed as an electric drive or as an internal combustion drive, for example. The drive is arranged in the drive housing. The transmission is arranged in the transmission housing. The fastening means comprises a plurality of vibration damping means and sleeve elements. Here, the sleeve elements surround the vibration damping elements. The vibration damping means can be arranged in the sleeve elements and fastened non positively on the sleeve elements, for example. Here, the sleeve elements can also each be formed as a particular region of the fastening means, for example.

The sleeve elements can be of ring-shaped design, for example. The vibration damping means can be press-fitted in the sleeve elements, for example. The drive housing or the transmission housing can be fastened on a carrier means by way of the fastening means. The carrier means is preferably designed to absorb a weight force of the drive housing and/or of the transmission housing and thus to support the drive housing and/or the transmission housing.

This design of the fastening means is particularly advantageous for damping the transmission of vibrations from the drive housing or transmission housing to the carrier means. Here, damping is accomplished by means of the vibration damping means, which may also be referred to as absorbers. The vibration damping means can be designed as an elastomer component, for example.

According to one embodiment of the invention, the transmission housing or the drive housing can be fastenable on a single carrier means by way of the fastening means. It should be noted here that it is also possible for the transmission housing or the drive housing to be fastenable on further carrier means by further fastening means. However, fastening by way of the abovementioned fastening means takes place only on a single carrier means.

According to one embodiment of the invention, the vibration damping means can be of ring-shaped design. Thus, they can each have a through opening which can be used to secure the drive housing or the transmission housing on the carrier means, for example.

According to one embodiment of the invention, the fastening means can comprise fastening elements. The vibration damping means can in each case comprise a through opening through each of which one of the fastening elements is passed. The fastening elements can be fastened directly or indirectly on the transmission housing or on the drive housing. In the case of direct fastening, the fastening elements are in direct contact with the transmission housing or the drive housing. In the case of indirect fastening, the fastening elements can be fastened on a component which is fastened on the transmission housing or on the drive housing.

According to one embodiment of the invention, the fastening elements can be designed as bolts or screws.

According to one embodiment of the invention, the fastening means can comprise an intermediate component. The intermediate component can be fastened firmly on the drive housing or on the transmission housing. In the context of this description, this is understood particularly to mean that the intermediate component follows the movement of any vibrations of the drive housing or of the transmission housing. In this case, the fastening elements can be fastened on the intermediate component, for example.

According to one embodiment of the invention, the fastening means can comprise three vibration damping means. In particular, it is possible for the fastening means to comprise precisely three vibration damping means.

According to one embodiment of the invention, the drive assembly can comprise a further fastening means. The drive housing can be fastened on the carrier means by way of the fastening means. The further fastening means can comprise a plurality of further vibration damping means, by way of which the transmission housing can be fastened on a further carrier means. Here, the further vibration damping means can be designed in the manner described above with respect to the vibration damping means. The further fastening element can be designed in the manner described above with respect to the fastening element.

According to one embodiment of the invention, it is possible for the transmission housing to be fastenable on the carrier means by way of the vibration damping means of the fastening means. The drive assembly can be free from further vibration damping means by way of which the transmission housing or the drive housing can be fastened on the carrier means or on further carrier means. However, it is of course possible here for the transmission housing and/or the drive housing to be fastened on the carrier means or on further carrier means. However, this is then accomplished without vibration damping means.

The motor vehicle comprises a drive assembly according to one embodiment of the invention, and the carrier means. If appropriate, the motor vehicle can also comprise the further carrier means.

BRIEF DESCRIPTION OF THE DRAWING FIGURES

Further features and advantages of the present invention will become clear from the following description of preferred illustrative embodiments with reference to the appended figures. Here, the same reference signs are used for identical or similar components and for components with identical or similar functions. In the figures.

DETAILED DESCRIPTION OF THE INVENTION

Figure 1:
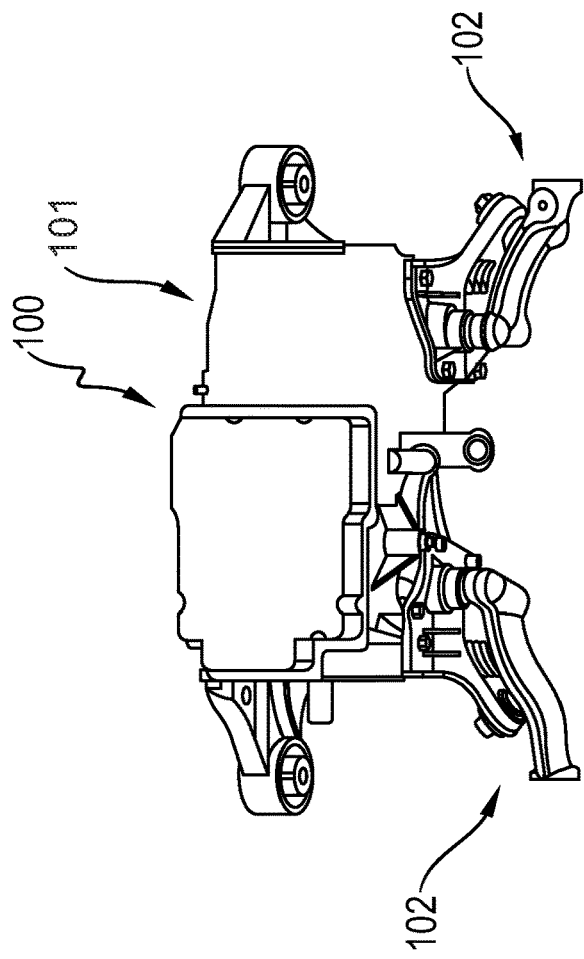
FIG. 1 shows a schematic perspective view of a drive assembly according to one embodiment of the invention having two fastening means.

The drive assembly in FIG. 1 comprises a drive housing 100 and a transmission housing 101. A drive is arranged in the drive housing 100. Arranged in the transmission housing 101 is a transmission, which can be driven by the drive. Moreover, the drive assembly comprises two fastening means 102. In this case, one of the fastening means 102 is fastened on the drive housing 100, while the other fastening means 102 is fastened on the transmission housing 101.

Figure 2:
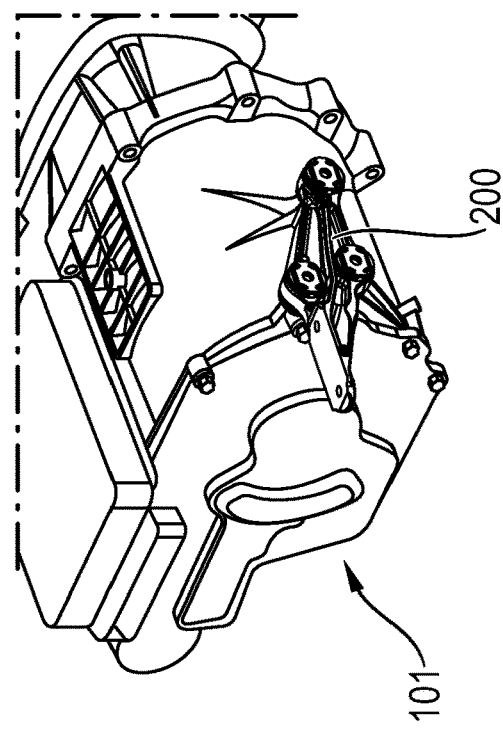
FIG. 2 shows a schematic perspective view of a drive assembly according to one embodiment of the invention having one fastening means.

The drive assembly in FIG. 2 comprises a transmission housing 101 and a fastening means 200, which is fastened on the transmission housing 101.

Figure 3:
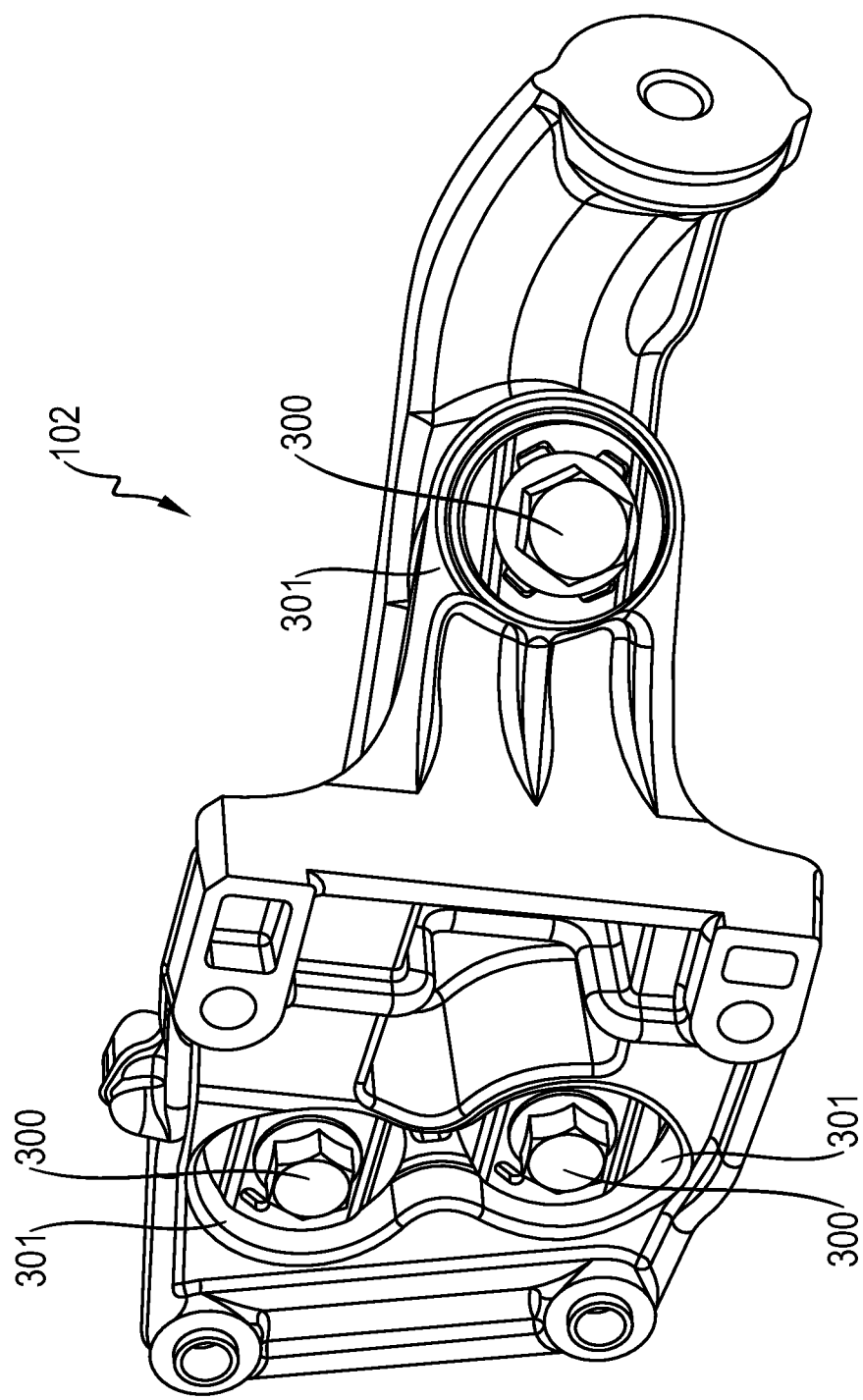
FIG. 3 shows a schematic perspective view of a section of a fastening means from FIG. 1.

One of the fastening means 102 from FIG. 1 is illustrated in more detail in FIG. 3. The fastening means 102 comprises three screws 300 and three sleeve elements 301, which are designed as ring-shaped sections of the fastening means 102. The sleeve elements 301 each have a through opening, through which the screws 300 project. Here, ring-shaped vibration damping means are likewise arranged in the through openings. The screws 300 likewise project through openings of these vibration damping means.

The screws 300 are fastened on the transmission housing 101 or on the drive housing 100. The fastening means 102 can furthermore be fastened on a carrier means, with the result that the fastening of the transmission housing 101 or of the drive housing 100 on the carrier means is accomplished by way of the fastening means 102. By virtue of the vibration damping means, vibrations of the transmission housing 101 or of the drive housing 100 are damped or even eliminated. The vibration damping means can each be designed as an elastomer component, for example.

Figure 4:
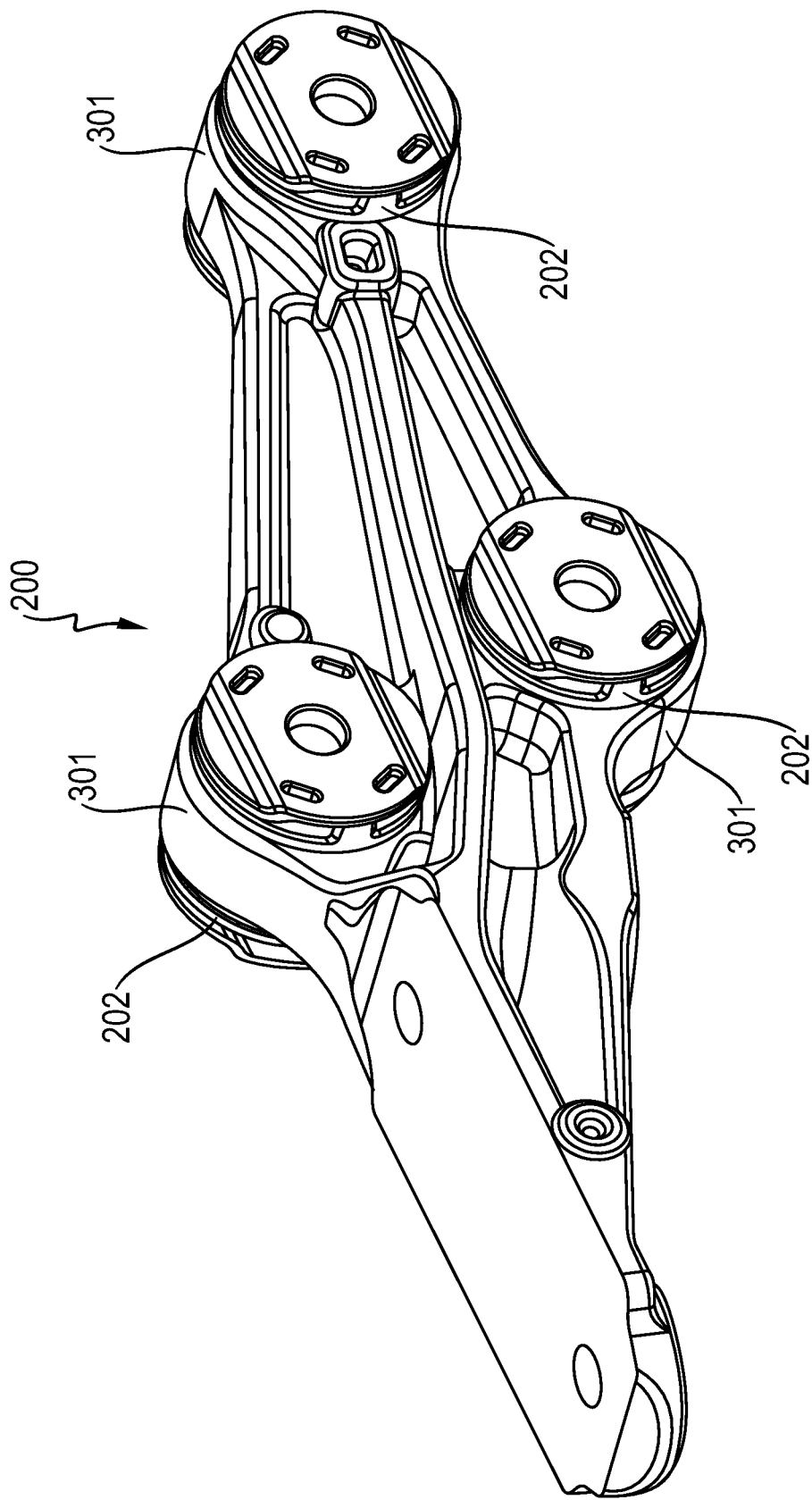
FIG. 4 shows a schematic perspective view of the fastening means from FIG. 2.

The fastening means 200 in FIG. 4 has three ring-shaped sleeve elements 301, which are designed as sections of the fastening means 200. The sleeve elements 301 have through openings, in which vibration damping means 202 are press-fitted. The vibration damping means 202 likewise have through openings, through which screws or bolts can be passed to fasten the fastening element 200 on the transmission housing 101.

Figure 5:
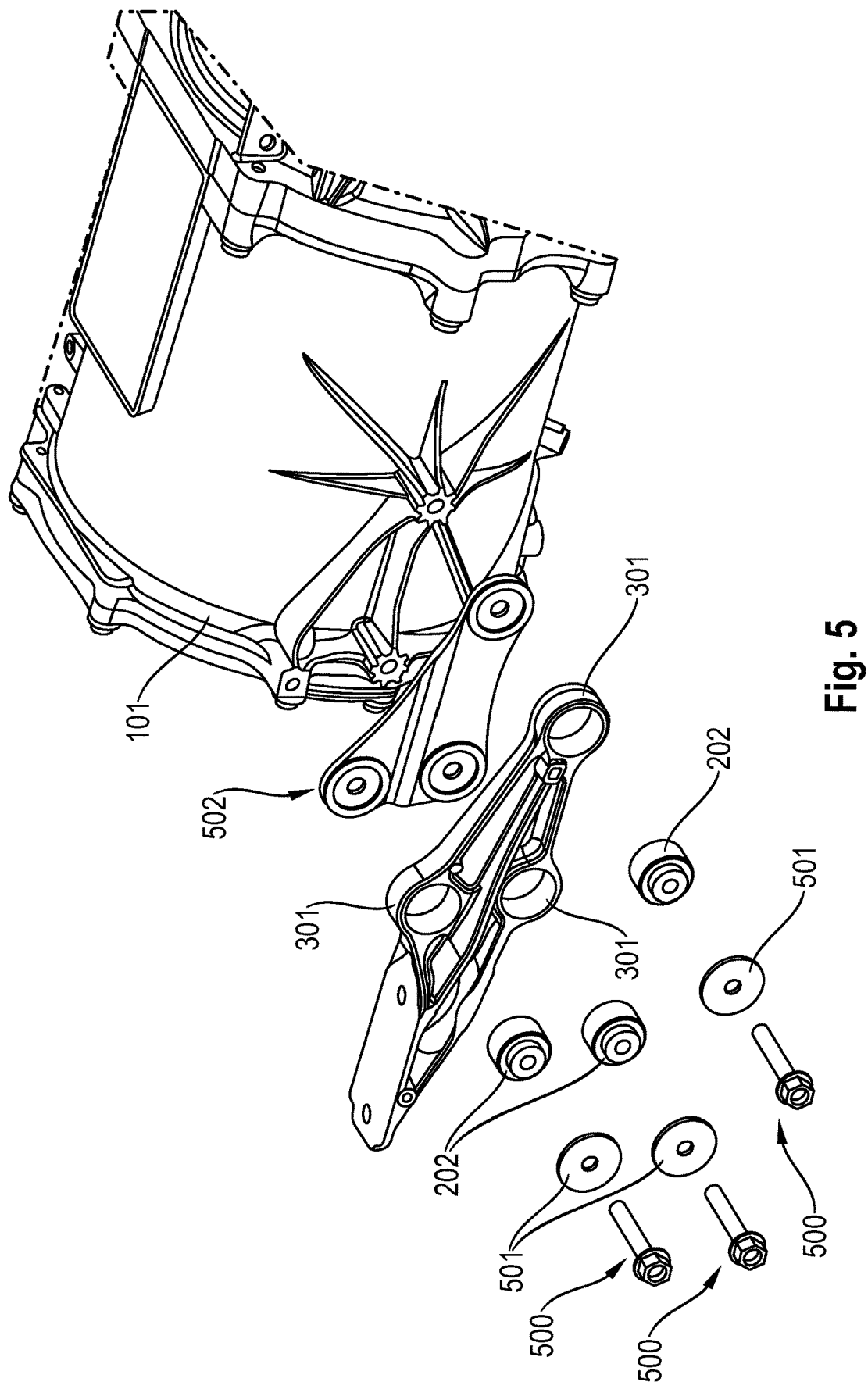
FIG. 5 shows a schematic, partially exploded illustration of the fastening means from FIG. 4 and of the transmission housing from FIG. 2.

The vibration damping means 202 are illustrated in FIG. 5. They are press-fitted into the sleeve elements 301 and held there by nonpositive engagement. The screws 500 are then passed through the through openings of the vibration damping means 202 and fastened on the transmission housing 101. In the assembled state, the heads of the screws 500 rest against stop washers 501.

Figure 6:
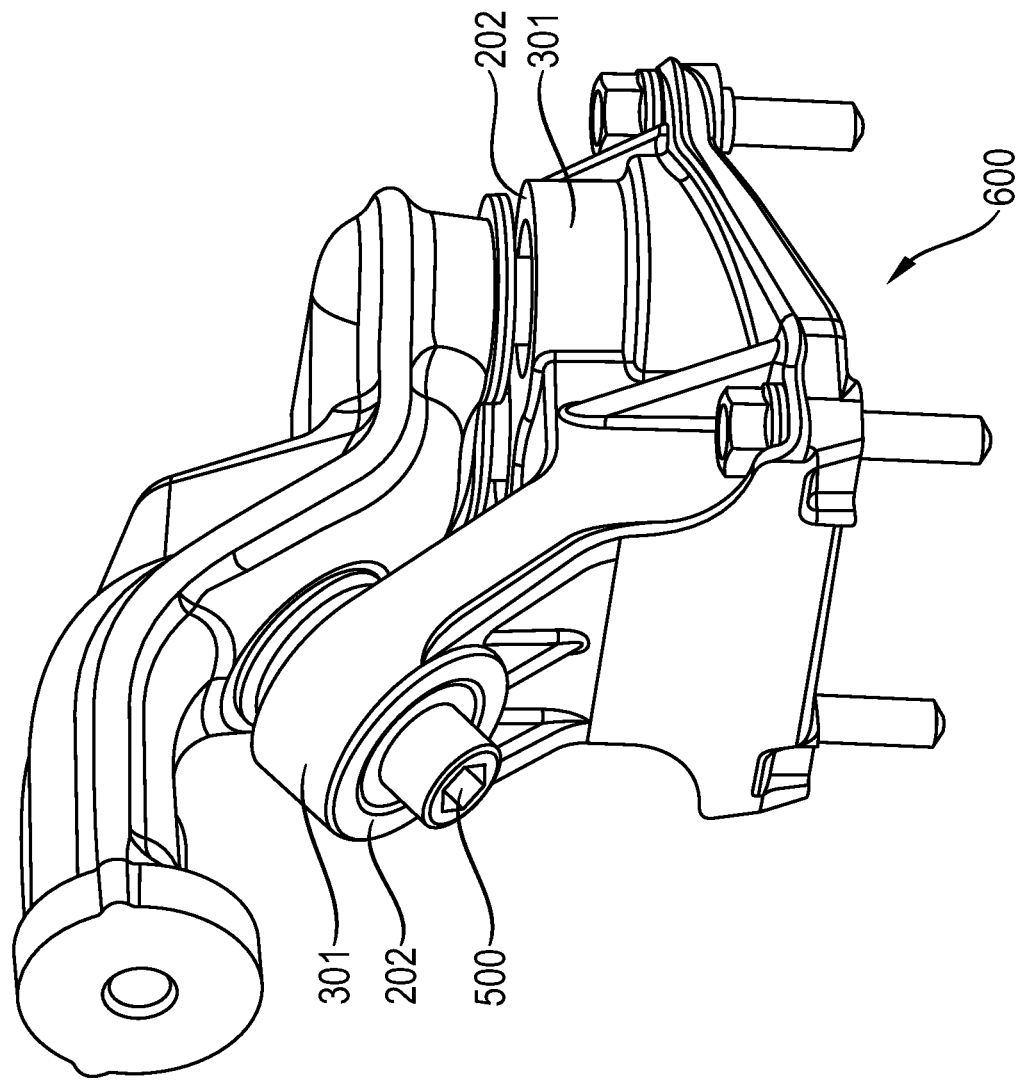
FIG. 6 shows a schematic perspective illustration of a fastening means according to one embodiment of the invention.

A further fastening means 600, which can be used in a similar way to fastening means 200, is illustrated in FIG. 6. It likewise comprises a plurality of screws 500 and a plurality of vibration damping means 202, wherein the screws 500 project through openings of these vibration damping means 202.

Figure 7:
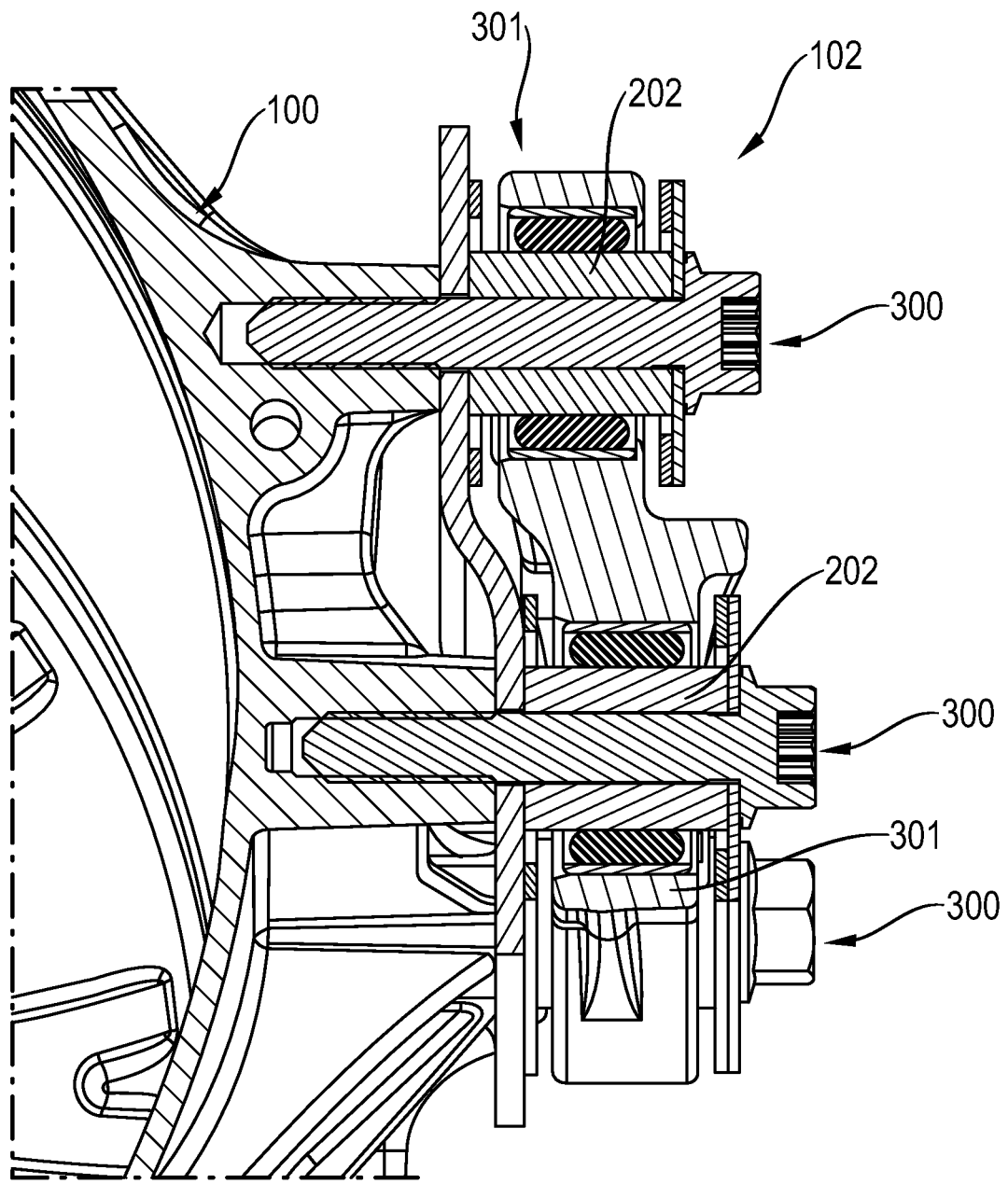
FIG. 7 shows a schematic section through a fastening means from FIG. 1.

The fastening means 102 are illustrated in FIG. 7. The sectional illustration makes it possible to say that the screws 300 project through the through openings of the vibration damping means 202 into the drive housing 100. In this case, the vibration damping means 202 (e.g., vibration dampers) are press-fitted in the sleeve elements 301.

Common to the fastening means 102, 200 and 600 is that the vibration damping means 202 are press-fitted in the sleeve elements 301 and that the screws 300 and 500 by means of which the drive housing 100 or the transmission housing 101 can be fastened on the carrier means project through through-openings of the vibration damping means 202. This is a particularly low-cost and, above all, space-saving arrangement for efficiently damping vibrations occurring in the drive or in the transmission.

What is claimed is:

1. A drive assembly for a motor vehicle, said drive assembly comprising:
    a drive,
    a transmission that is configured to be driven by the drive,
    a drive housing,
    a transmission housing, and
    a fastening means,
    wherein the drive is arranged in the drive housing, and the transmission is arranged in the transmission housing,
    wherein either the drive housing or the transmission housing is configured to be fastened on a carrier by way of the fastening means,
    wherein the fastening means comprises a plurality of vibration damping means and sleeve elements,
    wherein the sleeve elements surround the vibration damping means,
    wherein the fastening means comprises fastening elements,
    wherein the vibration damping means, in each case, comprise a through-opening through each of which one of the fastening elements is passed in an axial direction,
    wherein the fastening elements are fastened on the transmission housing or on the drive housing, and
    wherein each vibration damping element has a first portion having a first diameter, and a second portion, which protrudes from the first portion in the axial direction, that has a second diameter smaller than the first diameter and upon which a head of one of the fastening elements rests either directly or indirectly.

2. The drive assembly as claimed in claim 1, wherein either the transmission housing or the drive housing is configured to be fastened on a single carrier by way of the fastening means.

3. The drive assembly as claimed in claim 1, wherein the vibration damping means is of ring-shaped design.

4. The drive assembly as claimed in claim 1, wherein the fastening elements are bolts or screws.

5. The drive assembly as claimed in claim 1, wherein the fastening means comprises an intermediate component, wherein the intermediate component is fastened firmly on the drive housing or on the transmission housing.

6. The drive assembly as claimed in claim 1, wherein the fastening means comprises three vibration damping means.

7. The drive assembly as claimed in claim 1, wherein the drive assembly comprises a further fastening means, wherein the drive housing is fastened on the carrier by way of the fastening means, and wherein the further fastening means comprises a plurality of further vibration damping means, by way of which the transmission housing is fastened on a further carrier.

8. The drive assembly as claimed in claim 1, wherein the transmission housing is configured to be fastened on the carrier by way of the vibration damping means of the fastening means, and wherein the drive assembly is free from further vibration damping means by way of which the transmission housing or the drive housing is fastened on the carrier or on a further carrier.

9. A motor vehicle comprising the drive assembly as claimed in claim 1, wherein the motor vehicle comprises the carrier.

10. The drive assembly as claimed in claim 1, wherein the second portion has a first bearing surface upon which the head of one of the fastening elements rests either directly or indirectly, and a second bearing surface opposite the first bearing surface.

11. The drive assembly as claimed in claim 10, wherein the first bearing surface protrudes beyond the first portion in a first axial direction, and the second bearing surface protrudes beyond the first portion in a second axial direction that is opposite to the first axial direction.

12. The drive assembly as claimed in claim 1, wherein the first portion of each vibration damping element is press-fitted to one of the sleeve elements.

13. The drive assembly as claimed in claim 1, wherein the fastening means further comprises the carrier, and wherein the sleeve elements are disposed on the carrier.

14. The drive assembly as claimed in claim 13, wherein each sleeve element is fitted within an opening formed in the carrier.

15. The drive assembly as claimed in claim 13, wherein the sleeve elements are not all oriented parallel to each other.

\* \* \* \* \*